United States Patent
Kishimoto (12) 
(10) Patent No.: US 8,065,406 B2
(45) Date of Patent: Nov. 22, 2011

(54) JOB PROCESSING APPARATUS, METHOD FOR MANAGING JOB LOG IN THE JOB PROCESSING APPARATUS, AND SYSTEM FOR MANAGING JOB HISTORY

(75) Inventor: Hiroaki Kishimoto, Great Neck, NY (US)

(73) Assignee: Canon Kabushiki Kaisha (JP)

( * ) Notice: Subject to any disclaimer, the term of this patent is extended or adjusted under 35 U.S.C. 154(b) by 165 days.

(21) Appl. No.: 12/489,939

(22) Filed: Jun. 23, 2009

(65) Prior Publication Data

US 2010/0005167 A1  Jan. 7, 2010

(30) Foreign Application Priority Data

Jul. 1, 2008  (JP) .................................. 2008-172644

(51) Int. Cl.
*G06F 15/16* (2006.01)

(52) U.S. Cl. ......................... 709/223; 709/224; 358/1.15

(58) Field of Classification Search .................. 709/223, 709/224, 226; 358/1.13, 1.15, 1.16
See application file for complete search history.

(56) References Cited

U.S. PATENT DOCUMENTS

| | | | |
|---|---|---|---|
| 7,519,597 B2 * | 4/2009 | Kano ..................................... 1/1 |
| 7,782,473 B2 * | 8/2010 | Kizaki et al. .................. 358/1.13 |
| 7,817,292 B2 * | 10/2010 | Fujii ............................ 358/1.15 |
| 2005/0105129 A1 * | 5/2005 | Takahashi .................... 358/1.15 |
| 2007/0109589 A1 * | 5/2007 | Yokoyama .................... 358/1.15 |
| 2007/0133044 A1 * | 6/2007 | Tanaka ......................... 358/1.15 |
| 2008/0199199 A1 * | 8/2008 | Kato et al. ....................... 399/81 |
| 2009/0244620 A1 * | 10/2009 | Takahashi et al. ........... 358/1.15 |

FOREIGN PATENT DOCUMENTS

JP  2005-078160 A  3/2005

* cited by examiner

*Primary Examiner* — Frantz Jean
(74) *Attorney, Agent, or Firm* — Rossi, Kimms & McDowell LLP

(57) ABSTRACT

A job processing apparatus connectable to another job processing apparatus via a network, and if an instruction is given to execute a job including a first job and a second job using the job processing apparatus itself and a second job processing apparatus, then the first job is executed and history information on the first job is created by the job processing apparatus itself, and an instruction to execute the second job is given to the second job processing apparatus via the network. Then, if the history information on the second job executed by the second job processing apparatus is received by the job processing apparatus itself via the network, the history information on the first and second jobs are stored in a log database in association.

12 Claims, 8 Drawing Sheets

JOB PROCESSING APPARATUS, METHOD FOR MANAGING JOB LOG IN THE JOB PROCESSING APPARATUS, AND SYSTEM FOR MANAGING JOB HISTORY

BACKGROUND OF THE INVENTION

1. Field of the Invention

The present invention relates to a job processing apparatus, a method for managing a job log in the job processing apparatus, and a system for managing a job history, the system including a plurality of job processing apparatuses connected via a network.

2. Description of the Related Art

Digital multi-function peripherals (MFPs) having the functions of a printer, a facsimile, a scanner, and the like have rapidly become popular recently. Various types of such digital MFPs are available, and it is becoming common to install a plurality of digital MFPs having different functions in an office.

Meanwhile, history information relating to operations on these MFPs, printing and data transmission using these MFPs, and the like is becoming very important in terms of security, for example, preventing the leaking of information, and tracing information. In such circumstances, a method that is accurate and that does not impair convenience for the user and for the device administrator as much as possible has been demanded in terms of methods for managing job logs and operation histories in respective MFPs as well.

Generally, history information on the operations of a digital MFP and printing therewith, called a "job log", is created and managed in respective digital MFPs. Japanese Patent Laid-Open No. 2005-078160 aims to manage job history information including whether or not a print job has been executed. To be specific, a print job management apparatus that is connected to a plurality of MFPs and that gives notification via an e-mail to the user who executed printing in an MFP after the elapse of a predetermined period of time has been proposed. This is to appropriately notify the user of the history information, that is the result of the operations and print instructions from the user on a digital MFP. However, this method is for managing and giving notification of the history information on user operations and print instructions executed by individual digital MFPs and, for example, if an operation that uses the functions of a plurality of digital MFPs in a cooperative manner is executed, notification of the history information is not accurately given to the user.

In another example, a case where an image of an original document is read by scanning with a first digital MFP and then printed with a second digital MFP is assumed. History information relating to such an operation by a user is comprised of a scanning operation by the first digital MFP, and printing by the second digital MFP. Therefore, because the history information in a single digital MFP is obtained using the above-described conventional method, it is difficult to obtain history information integrating a series of operations using these two MFPs. That is, it is necessary that a user or a device administrator separately obtains and manages history information on the scanning operation with the first digital MFP and history information on the printing with the second digital MFP.

SUMMARY OF THE INVENTION

An aspect of the present invention is to eliminate the above-described problems with the conventional technology.

According to an aspect of the present invention, a log of a job executed by a plurality of job processing apparatuses in cooperation can be managed in association with each other.

According to the present invention in its first aspect, there is provided a job processing apparatus connected to a second job processing apparatus via a network, comprising: a job execution unit that, if an instruction is given to execute a cooperative job including a first job to be executed using the claimed job processing apparatus and a second job to be executed by the second job processing apparatus, executes the first job in the job processing apparatus, and creates history information on the first job executed by the job processing apparatus; a job management unit that stores, in a job storage unit, the history information created by the job execution unit in association with first identification information for identifying the history information and manages the cooperative job; an instruction unit that instructs the second job processing apparatus to execute the second job via the network; and a reception unit that receives second identification information for identifying history information on the second job executed by the second job processing apparatus via the network, wherein the job management unit links, and stores in the job storage unit, the first identification information, the second identification information received by the reception unit, and the history information on the first job.

According to the present invention in its second aspect, there is provided a method for managing a job log in a first job processing apparatus that is connected to a second job processing apparatus via a network, the method comprising: a job execution step of, if an instruction is given to execute a cooperative job including a first job to be executed using the first job processing apparatus and a second job to be executed by the second job processing apparatus, executing the first job in the first job processing apparatus, and creating history information on the first job executed by the first job processing apparatus; a job log management step of storing the history information created in the job execution step in association with first identification information for identifying the history information into a job storage unit and managing the cooperative job; an instruction step of instructing the second job processing apparatus to execute the second job via the network; and a receiving step of receiving second identification information for identifying history information on the second job executed by the second job processing apparatus via the network, wherein in the job log management step, the first identification information, the second identification information received in the receiving step, and the history information on the first job are linked and stored in the job storage unit.

According to the present invention in its third aspect, there is provided a system including a first job processing apparatus and a second job processing apparatus connected via a network, for managing a job history, wherein the first job processing apparatus comprises: job execution unit that, if an instruction is given to execute a cooperative job including a first job to be executed using the first job processing apparatus and a second job to be executed by the second job processing apparatus, executes the first job in the first job processing apparatus and creates history information on the first job executed by the first job processing apparatus; a job management unit that stores, in a job storage unit, the history information created by the job execution unit in association with first identification information for identifying the history information and manages the cooperative job; an instruction unit that instructs the second job processing apparatus to execute the second job via the network; and a reception unit that receives second identification information for identifying history information on the second job executed by the second job processing apparatus via the network; and the second job processing apparatus comprising: an execution unit that executes the second job according to the instruction from the instruction unit and creates history information on the second job executed by the second job processing apparatus; a log management unit that stores history information on the second job created in the execution unit; and a transmission unit that transmits the second identification information to the first job processing apparatus, wherein the job management unit links, and stores in the job storage unit, the first identification information, the second identification information received by the reception unit, and the history information on the first job.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described in detail with reference to the accompanying drawings.

It is to be understood that the following embodiments are not intended to limit the claims of the present invention, and that not all of the combinations of the aspects that are described according to the following embodiments are necessarily required with respect to the means to solve the problems according to the present invention.

Figure 1:
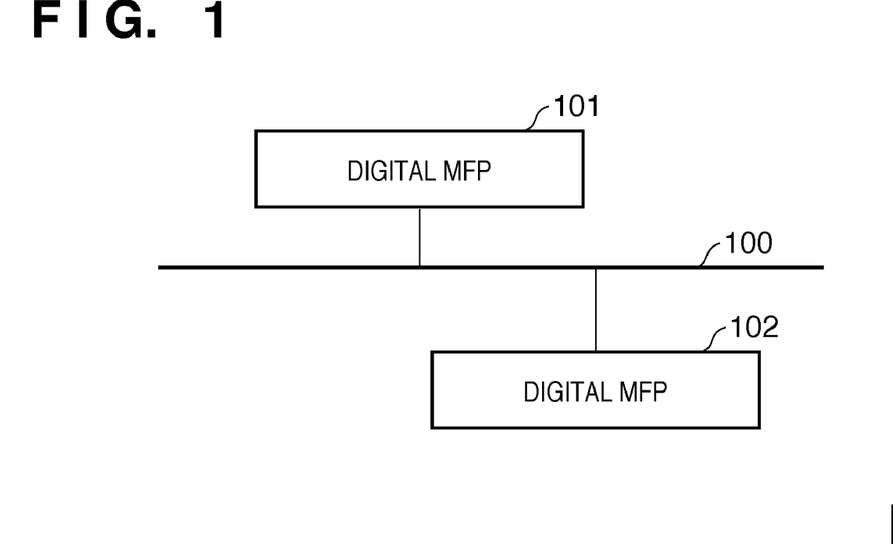
FIG. 1 is a diagram describing the configuration of a network according to an exemplary embodiment of the present invention.

FIG. 1 is a diagram describing the configuration of a network according to this embodiment.

In FIG. 1, two digital MFPs (in the following, referred to as MFPs) 101 and 102 are connected to a network 100.

Although an MFP (first MFP) 101 and an MFP (second MFP) 102 are connected to the network 100 in this embodiment, the present invention is not limited to the case where these two MFPs are included, and more MFPs may be connected. Furthermore, it is not necessary that the apparatus that processes a job is a multi-function peripheral, and the apparatus that processes a job may be a single-function job processing apparatus. In the following, an MFP is used as an example for description.

Figure 2:
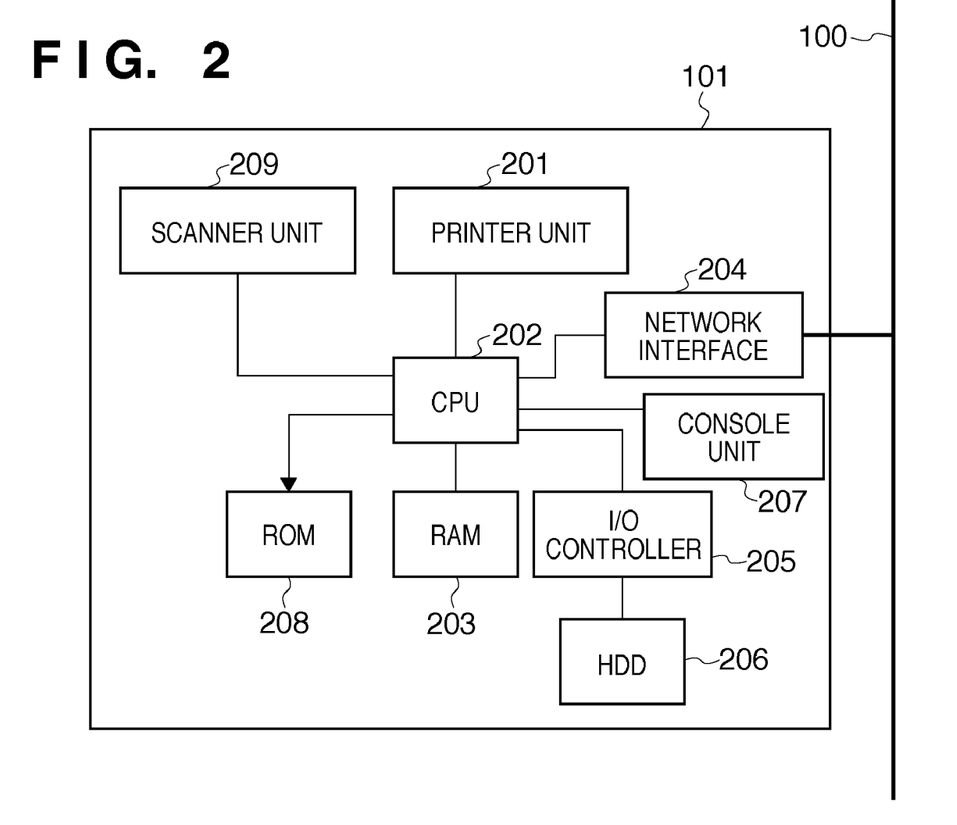
FIG. 2 is a diagram describing the internal configuration of an MFP according to the embodiment of the present invention.

FIG. 2 is a diagram describing the internal configuration of the MFP 101 according to this embodiment. The configuration of the MFP 102 is the same as that of the MFP 101, and therefore the description thereof is omitted.

A CPU 202 loads a program stored in a storage device (HDD) 206 that is connected via an I/O controller 205 into a RAM 203, and executes the program. Under the control of this program, a printer unit (printer unit) 201 and the execution of a print job are controlled, and a scanner unit 209 and a scan job are controlled. The MFP 101 is connected to the network 100 via a network interface 204. The MFP 101 and the MFP 102 can communicate with each other via the network interface 204. A console unit 207 includes a display unit that is integrally formed with various keys and buttons, and a touch panel. A ROM 208 stores a boot program and various data.

Figure 3:
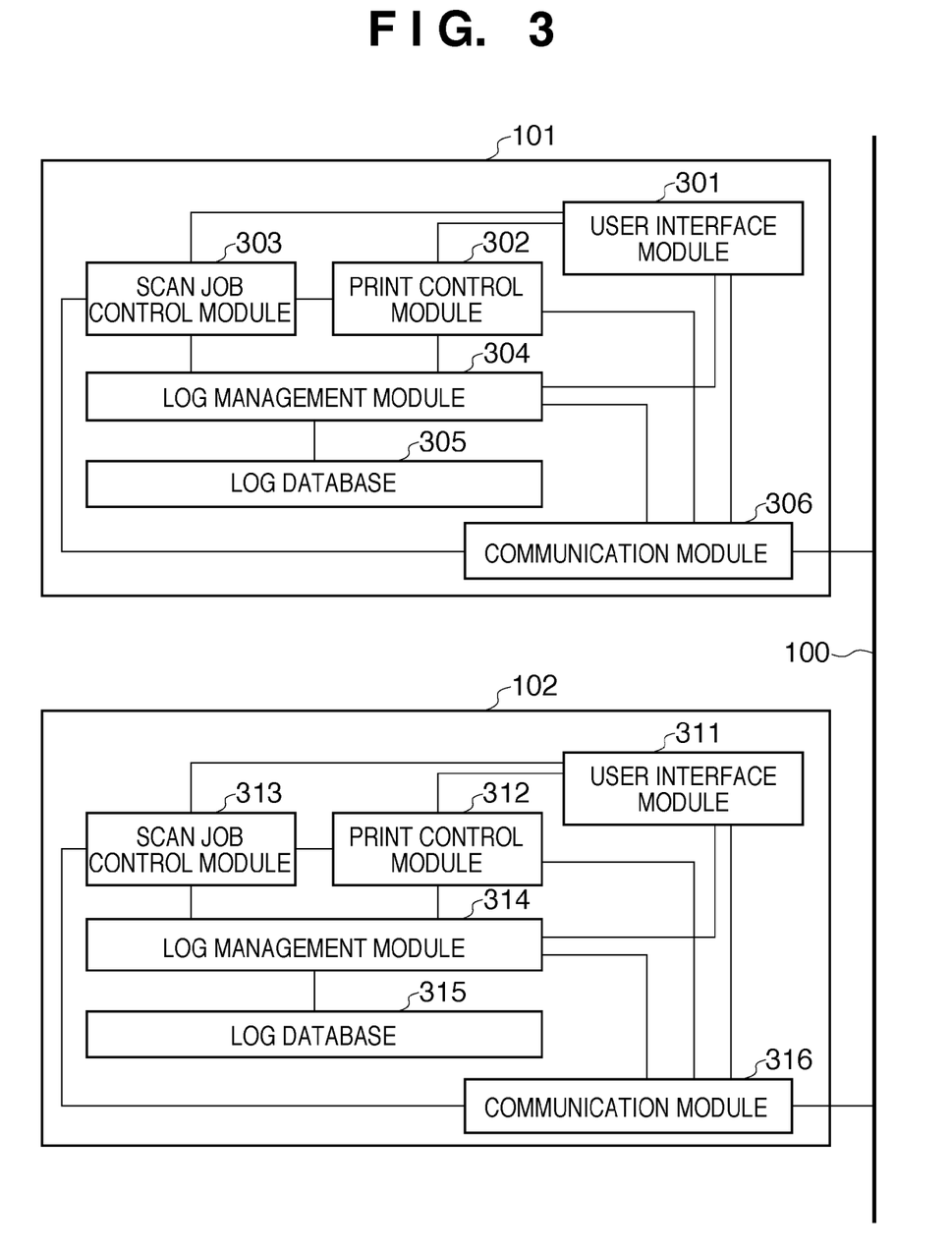
FIG. 3 is a diagram describing program modules loaded in the MFP according to the embodiment of the present invention.

FIG. 3 is a diagram describing the modules (programs) loaded in the MFP 101 (102) according to this embodiment. These modules are realized by being executed according to the program read from the HDD 206 and loaded into the RAM 203 as described in FIG. 2 according to the boot program stored in the ROM 208 in the CPU 202. In the following, the roles of respective modules are described. Descriptions are given mainly regarding the MFP 101 because the configurations of the MFPs 101 and 102 are the same.

A user performs operations based on a user interface module 301 displayed on the display unit of the console unit 207 of the MFP 101 (first MFP). The user gives instructions with this user interface module 301, thereby controlling a print control module 302 and a scan job control module 303, and causing the processing of scanning, copying, printing, and the like to be executed. The print control module 302 and the scan job control module 303 function as job execution units, and are connected to a log management module (job log management unit) 304. The print control module 302 and the scan job control module 303 create history information on print jobs and scan jobs, and store the history information in a log database (job log storage unit) 305. Details of such information stored in the log database 305 are to be mentioned later. The user interface module 301, the print control module 302, the scan job control module 303, and the log management module 304 are connected to a communication module 306. Each of these modules can communicate with individual modules of the MFP 102 via the communication module 306. Elements represented by reference numerals 311 to 316 in the MFP 102 correspond to the elements represented by reference numerals 301 to 306 of the above-described MFP 101; therefore, descriptions thereof are omitted. The MFPs 101 and 102 are capable of executing a solo job that is executed solely in the MFP, and a cooperative job that is a single job cooperatively executed by a plurality of MFPs.

In the following, descriptions are given of a case, as a cooperative job, where document data (scanned image) read by scanning an original document using the MFP 101 is printed using the MFP 102.

Figure 4:
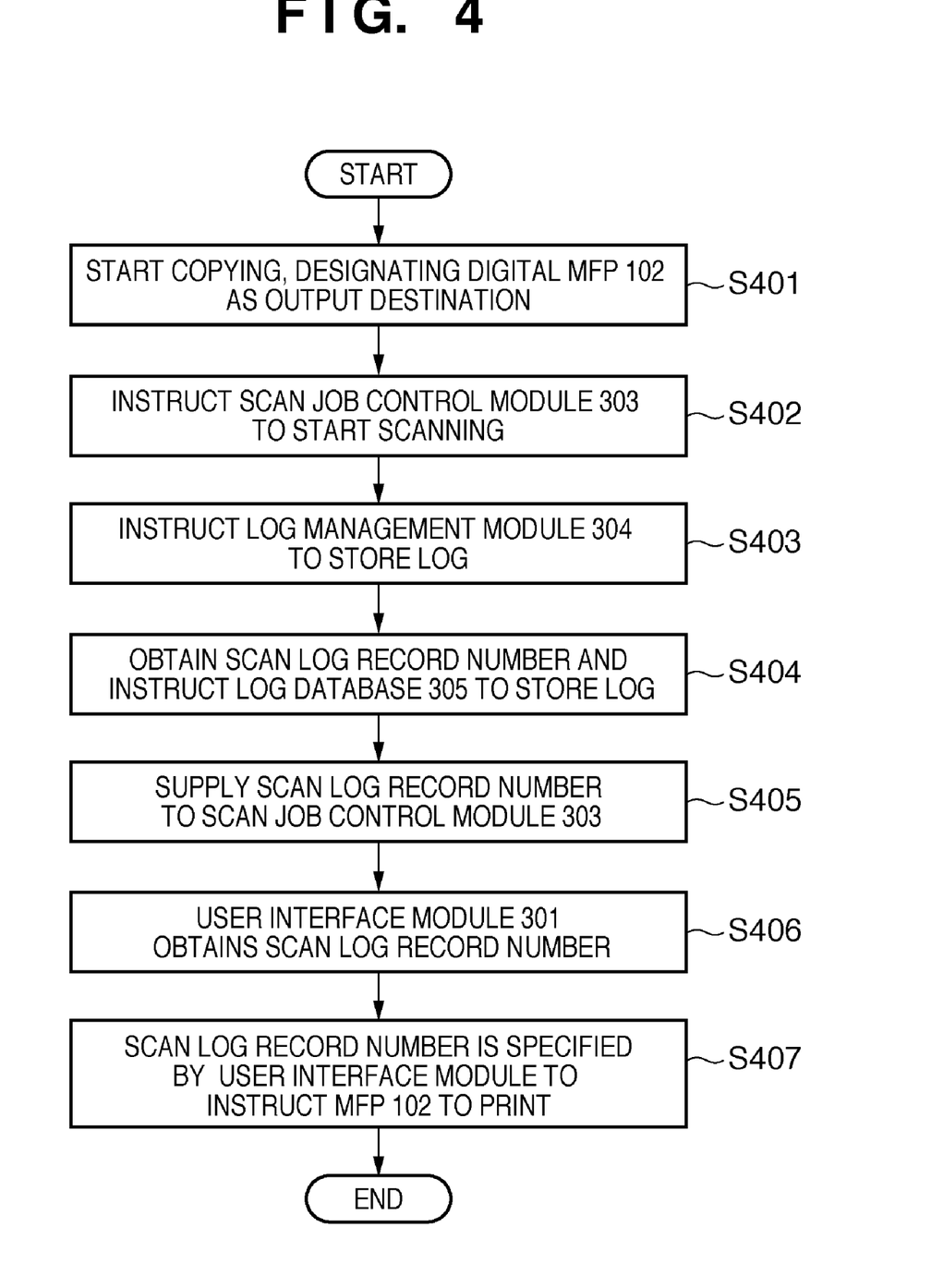
FIG. 4 is a flow chart describing processing according to the embodiment of the present invention in which an original document is read using an MFP 101, and printed using an MFP 102 based on the image data of the original document.

FIG. 4 is a flow chart describing processing by the MFP 101, reading an image on an original document with the MFP 101 according to this embodiment, and causing the MFP 102 to print the image based on image data representing the image. The program that executes this processing is loaded from the HDD 206 into the RAM 203 at the time of execution in the MFP 101, and executed under the control of the CPU 202.

First, in step S401, the user operates the console unit 207 of the MFP 101, and starts cooperative copy processing designating the MFP 102 as a print destination. The user interface module 301 thus receives this instruction, and starts the copy processing. Next, the process advances to step S402, and the user interface module 301 instructs the scan job control module 303 to scan an original document (first job) using the scanner unit 209. The scanner unit 209 thus executes reading (scanning) of the original document. After completing this scanning, the process advances to step S403, and the scan job control module 303 instructs the log management module 304 to store a scan log. In step S404, the log management module 304 thus instructs the log database 305 to create a scan log record number containing first identification information that relates to the job and that is unique, and to store the scan log record. The image data of the original document read at the scanner unit 209 may be stored in the HDD 206 and the like as the scan log.

Next, the process advances to step S405, and the log management module 304 conveys the scan log record number created by the log database 305 to the scan job control module 303. Next, in step S406, the user interface module 301 obtains the scan log record number from the scan job control module 303. Then, in step S407, the user interface module 301 conveys the obtained scan log record number to the print control module 302, and gives a print instruction setting the output destination to the MFP 102. At this time, the print instruction with the scan log record number, and with at least the network identifier (IP address) of the MFP 101 added, is sent to the MFP 102. Also, for the first identification information on the job, information indicating that it is a cooperative copy job setting the MFP 101 as a scanner and the MFP 102 as a printer, status information on scan job completion, and the like may be added to the information to be conveyed to the print control module 302.

Figure 5:
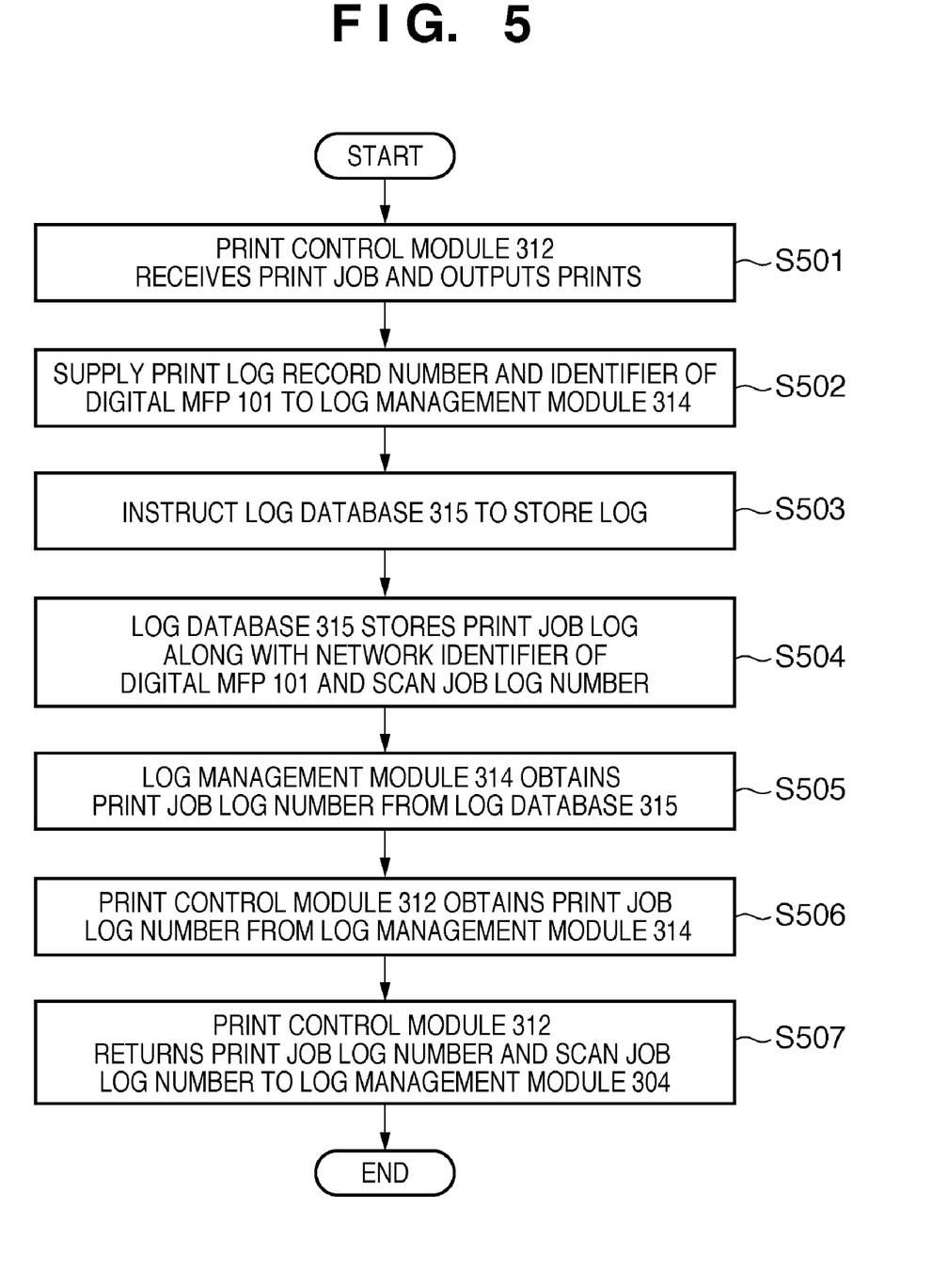
FIG. 5 is a flow chart describing the operations of the MFP 102 that receives a print instruction from a print control module of the MFP 101 according to the embodiment of the present invention.

Next, descriptions are given of the operations of the MFP 102 that receives the print instruction from the print control module 302 of the MFP 101.

FIG. 5 is a flow chart describing the operations of the MFP 102 that receives a print instruction from the print control module 302 of the MFP 101 according to this embodiment. The program that executes this processing is loaded from the HDD 206 into the RAM 203 of the MFP 102 at the time of execution in the MFP 102, and executed under the control of the CPU 202 of the MFP 102.

First, in step S501, in response to the print instruction (print job: second job) received by the communication module 316, the print control module 312 causes the printer unit 201 of the MFP 102 to print. After the completion of printing, the process advances to step S502, and the print control module 312 instructs the log management module 314 to create a unique print job log number and a print job log. At this time, the print control module 312 also supplies, simultaneously, the network identifier of the MFP 101 and the scan job log number from the job received from the MFP 101 to the log management module 314. Next, the process advances to step S503, and the log management module 314 instructs the log database 315 to create and store a unique print job log number and a print job log.

Next, the process advances to step S504, and the log database 315 adds second identification information containing the network identifier of the designated MFP 101, the scan job log number, and the like to the print job log, and stores the print job log. Because the MFP 102 can recognize based on the received scan job log number that the print job is a cooperative job, the job log is stored distinguishably from an independent job in the MFP 102. When the type of job is given at this time, information on the job type may be stored. When the completion status of the scan job is specified, such information may be stored. Next, the process advances to step S505, and the log management module 314 obtains the created unique print job log number of the print job from the log database 315. Next, the process advances to step S506, and the print control module 312 obtains the print job log number via the log management module 314. Next, the process advances to step S507, and the print control module 312 returns the log number of the print job obtained in step S506 and the network identifier (IP address) of the MFP 102 to the log management module 304 of the MFP 101. At this time, the scan job log number specified by the MFP 101 is also specified. Furthermore, the completion status of the print job may be added at the time to the information that is transmitted to the MFP 101. The print job may be executed after S507, instead of S501. Because the job log stored as described above is associated with the scan job log number, when the job log is referred, the MFP 101 is notified of the operation of the job log. That is, if the MFP 102 instructs the MFP 101 to refer a job log, then the MFP 102 can acquire the latest information on the job log from the MFP 101. Furthermore, if a deletion of a job log is instructed in the MFP 102, following deletion in the MFP 102, an instruction to delete the job log corresponding to the job log deleted in MFP 102 is also given to the MFP 101 from the MFP 102.

Figure 6:
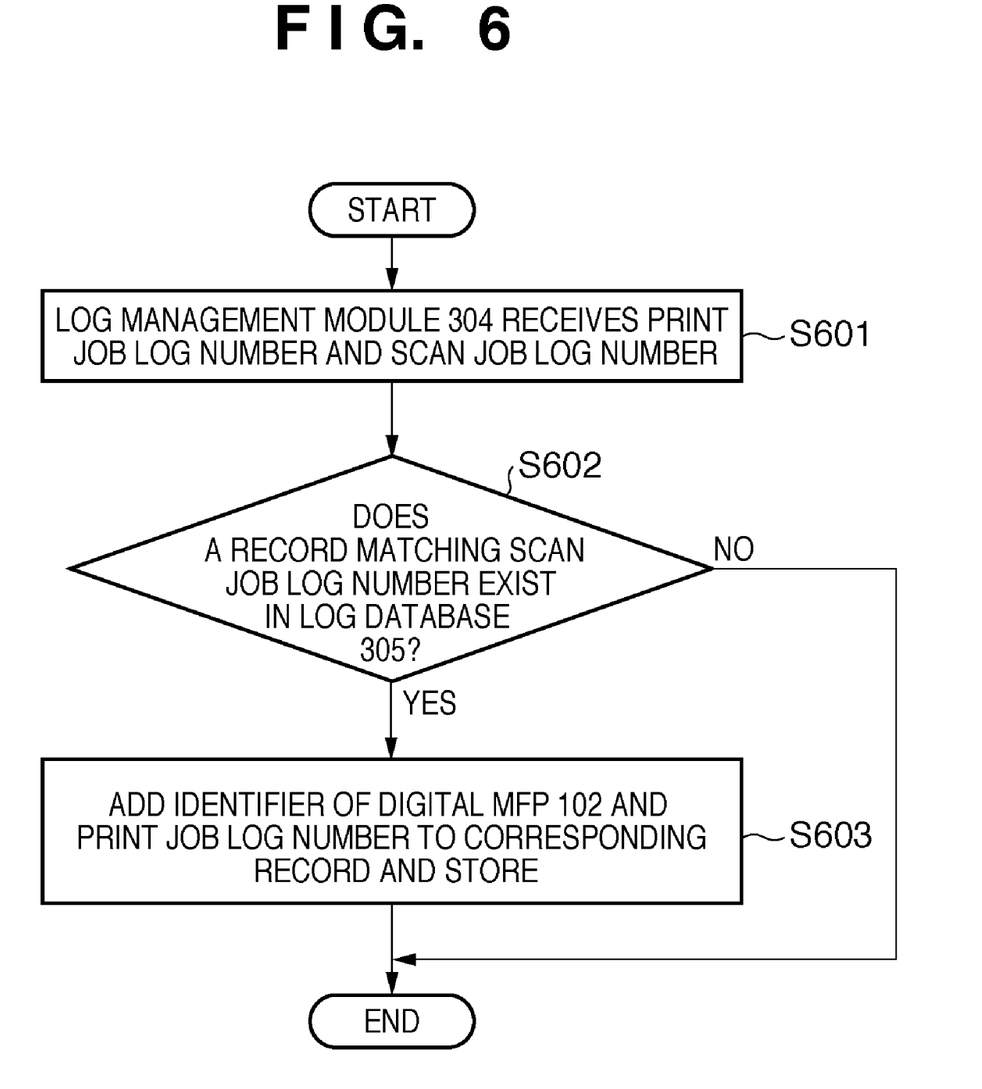
FIG. 6 is a flow chart describing processing in the MFP 101 that received a print job log number from a print control module of the digital MFP 102 according to the embodiment of the present invention.

FIG. 6 is a flow chart describing processing in the MFP 101 that received the print job log number from the print control module 312 of the MFP 102 according to this embodiment. The program that executes this processing is loaded from the HDD 206 into the RAM 203 at the time of execution in the MFP 101, and executed under the control of the CPU 202 of the MFP 101.

In step S601, the log management module 304 of the MFP 101 receives the print job log number and the scan job log number from the print control module 312 of the MFP 102. Next, the process advances to step S602, and the log management module 304 searches the log database 305 for the record based on the scan job log number, and determines whether or not the matching record exists. If there is no matching record, then the processing terminates without performing a specific action.

On the other hand, if there is a matching record, then the process advances from step S602 to step S603, and the log management module 304 updates the matching record in the log database 305, and terminates the processing. To be specific, the network identifier and the print job log number of the MFP 102 are added to the record. If the completion status of the print job is specified, such information may also be added and stored. Because the MFP 101 can recognize based on the print job log number that the print job is a cooperative job, the job log is stored distinguishably from an independent job in the MFP 101. Because the job log stored as described above is associated with the print job log number, if the job log is operated in the MFP 101, the MFP 102 is notified of the operation of the job. That is, if the MFP 101 instructs the MFP 102 to refer a job log, then the MFP 101 can acquire the latest information of the job log from the MFP 102. Furthermore, if a deletion of a job log is instructed in the MFP 101, following the deletion in the MFP 101, an instruction to delete the job log corresponding to the job log deleted in the MFP 101 is also given to the MFP 102.

Figure 7:
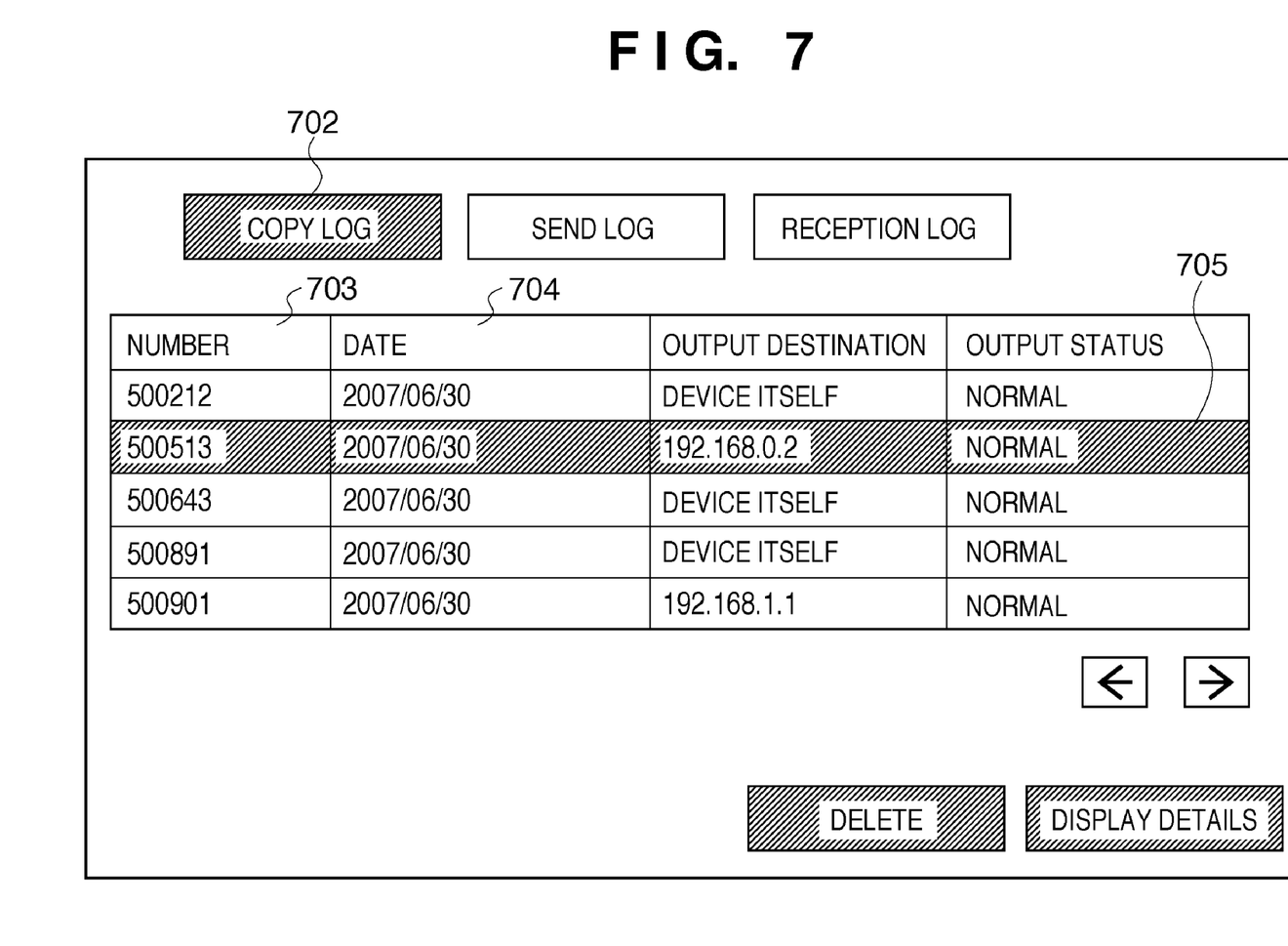
FIG. 7 is a diagram describing an example of a job log displayed on a display unit of a console unit of the MFP according to the embodiment of the present invention.

FIG. 7 is a diagram describing an example of a job log displayed on the display unit of the console unit 207 of the MFP 101 according to the embodiment. The job log is displayed by the user interface module 301 that controls the display on the display unit of the console unit 207.

A copy log, a send log, and a reception log can be displayed here, and in the example in FIG. 7, a "copy log" 702 is selected. Reference numeral 703 denotes a job log number (identification information of a copy log) uniquely assigned to a copy log. A date 704 indicates the date when the copy log is generated. The output destination designates the MFP of the output destination used in the copy log, and if the output destination is not the device (the MFP 101) itself, the IP address of the MFP of the output destination is set therein. The display in FIG. 7 is made based on the information obtained by the user interface module 301 via the log management module 304. Here, a copy log 705 including the above-described scan operation in the MFP 101 and the print operation in the MFP 102 is designated.

The log number "500513" of the copy log 705 is a scan job log record number executed by the MFP 101. If printing of the copy job is done by the device itself, that is, the MFP 101, then the output destination of the copy job will be "device itself". On the other hand, if the output destination of the copy job is designated to an MFP other than the MFP 101, then the output destination is indicated by the network identifier (IP address) of the MFP (for example, the MFP 102). In the copy log 705, the IP address (192.168.0.2) of the MFP 102 as the output destination is associated therewith and set. Furthermore, in the copy log 705, the completion status of a print job of the copy job returned from the MFP 102 is shown as the output status (here, "normal") in the copy log 705. If the completion status of the print job is not received from the MFP 102, then the log management module 304 may obtain the completion status of the print job from the log management module 314 of the MFP 102. In the copy log to be stored, the image data itself after processing (for example, reduced image data) may also be stored together. In this way, it also becomes possible to manage on what kind of image the processing is performed.

Figure 8:
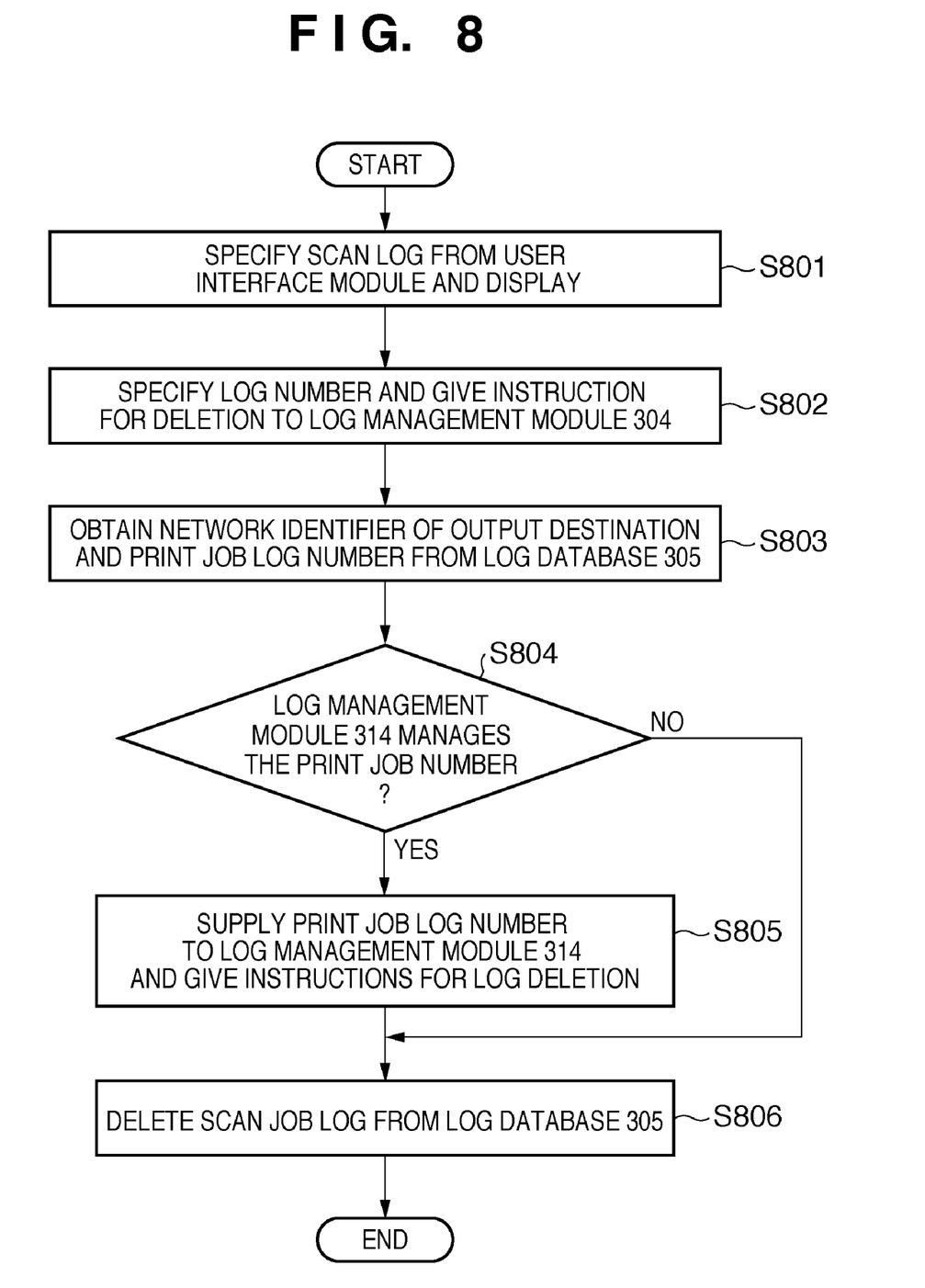
FIG. 8 is a flow chart describing processing in which a job log is deleted in the MFP 101 according to the embodiment of the present invention.

FIG. 8 is a flow chart describing processing in which a job log is deleted in the MFP 101 according to the embodiment. The program that executes this processing is loaded from the HDD 206 into the RAM 203 at the time of execution in the MFP 101, and executed under the control of the CPU 202 of the MFP 101.

First, in step S801, the user interface module 301 displays a job log record based on user operation on the console unit 207, recognizing the designation of the job log record. If, for example, the job log record of the copy log 705 in FIG. 7 is to be deleted, the user designates the job log number (here, "500513") of the job log record and gives instructions for deletion. Then, the user interface module 301 outputs the job log number of the job log record to the log management module 304 in step S802, and gives instructions for deletion to delete the job log (the copy log 705). Next, the process advances to step S803, and the log management module 304 refers to the log database 305 based on the job log number, and obtains the print job number and the network identifier of the MFP 102 that was the output destination of the copy log 705. Next, the process advances to step S804, and the log management module 304 refers to the log management module 314 of the MFP 102, that is, the output destination obtained in step S803, for the print job log based on the print job log number. As a result of such reference, if it is determined that the print job log with the print job log number is not included in the MFP 102, then the process advances from step S804 to step S806, only the scan job log of the MFP 101 is deleted.

On the other hand, if it is determined that the print job log with the print job log number is included in the MFP 102, that is, the output destination in step S804, then the process advances from step S804 to step S805. In step S805, the print job log number obtained in step S803 is supplied to the log management module 314 of the MFP 102, and deletion of the print job log is instructed to the MFP 102. Then in step S806, the scan job log of the MFP 101 is deleted.

If the job log is to be deleted by an operation from the console unit 207 of the MFP 102, the processing is to be performed in the same manner, switching the print job log and the scan job log in the above-described processing between the MFP 101 and the MFP 102.

Figure 9:
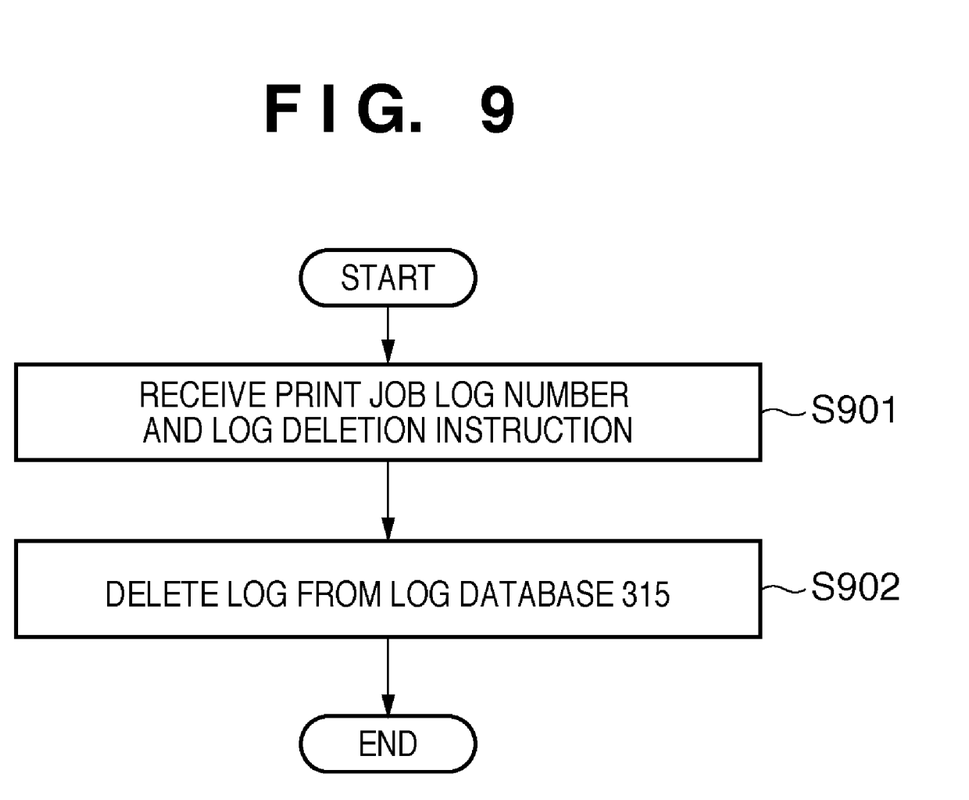
FIG. 9 is a flow chart describing processing of the MFP 102 that received a log deletion instruction from the MFP 101 in step S805 of FIG. 8.

FIG. 9 is a flow chart describing processing of the MFP 102 that received a log deletion instruction from the MFP 101 in step S805 of FIG. 8. The program that executes this processing is loaded from the HDD 206 into the RAM 203 at the time of execution in the MFP 102, and executed under the control of the CPU 202 of the MFP 102.

In step S901, the log management module 314 of the MFP 102 receives a print job log number and an instruction for log deletion from the MFP 101. Then, the process advances to step S902, and the log management module 314 gives instructions for log deletion to the log database 315, and deletes the job log. After then in the MFP 101, the log management module 304 gives instructions for deletion of the scan log based on the scan job log number to the log database 305, and deletes the log (step S806).

If the instruction for job log deletion is given by an operation from the console unit 207 of the MFP 102, then the processing is to be performed in the same manner, switching the print job log and the scan job log in the above-described processing between the MFP 101 and the MFP 102.

The descriptions above are for the case where the MFP 101 is used for designation of a copy operation and the MFP 102 is designated as the output (print) destination. However, the present invention is not limited to such a case, and it can be easily assumed that such an execution can be performed even when the MFP 102 is used for designation of a copy operation and the MFP 101 is designated as the output (print) destination, by switching the MFP 101 and the MFP 102 in the above description.

Furthermore, although descriptions are given in the case of a copy operation in the above-described embodiment, the present invention is not limited thereto. For example, the embodiment can be applied to a case where a facsimile transmission is performed by reading an original document with one MFP (for example, the MFP 101), and sending the original document image via facsimile transmission from the other MFP (for example, the MFP 102). Or, the embodiment can be applied to a case where a box function is used, reading an original document with one MFP (for example, the MFP 101), and storing the document in the HDD of another MFP (for example, the MFP 102). The embodiment can also be applied to a case where a cooperative job is performed using a first job processing apparatus that is not an MFP, for example, having a scanner function but no print function, and a second job processing apparatus having no scanner function but having a print function.

Other Embodiments

The present invention can also be achieved by directly or remotely supplying a software program that realizes the functionality of the abovementioned embodiments to a system or device, whereupon a computer in the system or device reads out and executes the supplied program. In such a case, the format does not necessarily need to be a program, as long as it has the functionality of a program.

In addition to a computer realizing the functionality of the aforementioned embodiments by executing a read-out program, the functionality of the embodiments may be realized through another form. For example, the functionality of the aforementioned embodiments can also be implemented by an operating system (OS) or the like running on a computer, executing part or all of the processing based on instructions in the program.

Furthermore, the program read out from the storage medium may be written into a memory provided in a function expansion board installed in the computer or a function expansion unit connected to the computer.

In this case, after the program has been written into the function expansion board, function expansion unit, or the like, a CPU or the like provided in the function expansion board, function expansion unit, or the like executes part or all of the actual processing based on the instructions of the program, and the functionality of the aforementioned embodiments can be realized through this processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2008-172644, filed Jul. 1, 2008, which is hereby incorporated by reference herein in its entirety.

What is claimed is:

1. A job processing apparatus connected to a second job processing apparatus via a network, comprising:
    a job execution unit that, if an instruction is given to execute a cooperative job including a first job to be executed using the first job processing apparatus and a second job to be executed by the second job processing apparatus, executes the first job in the job processing apparatus, and creates history information on the first job executed by the job processing apparatus;
    a job management unit that stores, in a job storage unit, the history information created by the job execution unit in association with first identification information for identifying the history information and manages the cooperative job;
    an instruction unit that instructs the second job processing apparatus to execute the second job via the network; and
    a reception unit that receives second identification information for identifying history information on the second job executed by the second job processing apparatus via the network,
    wherein the job management unit links, and stores in the job storage unit, the first identification information, the second identification information received by the reception unit, and the history information on the first job.

2. The apparatus according to claim 1, wherein the instruction unit notifies the second job processing apparatus of the first identification information via the network at the time of giving instructions for the execution of the second job.

3. The apparatus according to claim 1, wherein the job management unit searches for the history information on the first job relating to the history information on the second job based on the second identification information to manage the cooperative job.

4. The apparatus according to claim 1, further comprising a display control unit that displays the history information on the first job and the history information on the second job related to the history information on the first job as one job history.

5. The apparatus according to claim 1, further comprising:
    a deletion designation unit that designates the history information on the first job for deletion; and
    a deletion unit that instructs the second job processing apparatus to delete the history information on the second job related to the history information on the first job in response to the designation by the deletion designation unit.

6. A method for managing a job log in a first job processing apparatus that is connected to a second job processing apparatus via a network, the method comprising:
    a job execution step of, if an instruction is given to execute a cooperative job including a first job to be executed using the first job processing apparatus and a second job to be executed by the second job processing apparatus, executing the first job in the first job processing apparatus, and creating history information on the first job executed by the first job processing apparatus;
    a job log management step of storing the history information created in the job execution step in association with first identification information for identifying the history information into a job storage unit and managing the cooperative job;
    an instruction step of instructing the second job processing apparatus to execute the second job via the network; and
    a receiving step of receiving second identification information for identifying history information on the second job executed by the second job processing apparatus via the network,
    wherein in the job log management step, the first identification information, the second identification information received in the receiving step, and the history information on the first job are linked and stored in the job storage unit.

7. The method according to claim 6, wherein in the instruction step, the second job processing apparatus is notified of the first identification information via the network at the time of giving instructions for the execution of the second job.

8. The method according to claim 6, wherein in the job log management step, the history information on the first job relating to the history information on the second job is searched for based on the second identification information to manage the cooperative job.

9. The method according to claim 6, further comprising a display control step of displaying the history information on the first job and the history information on the second job related to the history information on the first job as one job history.

10. The method according to claim 6, further comprising:
    a deletion designation step of designating the history information on the first job for deletion; and
    a step of instructing the second job processing apparatus to delete the history information on the second job related to the history information on the first job in response to the designation in the deletion designation step.

11. A system including a first job processing apparatus and a second job processing apparatus connected via a network, for managing a job history,
wherein the first job processing apparatus comprises:
a job execution unit that, if an instruction is given to execute a cooperative job including a first job to be executed using the first job processing apparatus and a second job to be executed by the second job processing apparatus, executes the first job in the first job processing apparatus and creates history information on the first job executed by the first job processing apparatus;
a job management unit that stores, in a job storage unit, the history information created by the job execution unit in association with first identification information for identifying the history information and manages the cooperative job;
an instruction unit that instructs the second job processing apparatus to execute the second job via the network; and
a reception unit that receives second identification information for identifying history information on the second job executed by the second job processing apparatus via the network; and
the second job processing apparatus comprising:
an execution unit that executes the second job according to the instruction from the instruction unit and creates history information on the second job executed by the second job processing apparatus;
a log management unit that stores history information on the second job created in the execution unit; and
a transmission unit that transmits the second identification information to the first job processing apparatus,
wherein the job management unit links, and stores in the job storage unit, the first identification information, the second identification information received by the reception unit, and the history information on the first job.

12. A non-transitory computer-readable storage medium storing a computer program for causing a computer to execute each step of the method for managing a job log according to claim 6.

* * * * *